US008368039B2

(12) United States Patent
Govindaraju et al.

(10) Patent No.: US 8,368,039 B2
(45) Date of Patent: Feb. 5, 2013

(54) EUV LIGHT SOURCE GLINT REDUCTION SYSTEM

(75) Inventors: Abhiram Govindaraju, San Diego, CA (US); William N. Partlo, Poway, CA (US)

(73) Assignee: Cymer, Inc., San Diego, CA (US)

( * ) Notice: Subject to any disclaimer, the term of this patent is extended or adjusted under 35 U.S.C. 154(b) by 39 days.

(21) Appl. No.: 12/753,938

(22) Filed: Apr. 5, 2010

(65) Prior Publication Data

US 2011/0240890 A1 Oct. 6, 2011

(51) Int. Cl.
*G01J 3/10* (2006.01)

(52) U.S. Cl. .................................................... 250/504 R

(58) Field of Classification Search .............. 250/504 R, 250/493.1

See application file for complete search history.

(56) References Cited

U.S. PATENT DOCUMENTS 6,549,551 B2 4/2003 Partlo et al.
6,567,450 B2 5/2003 Myers et al.
6,625,191 B2 9/2003 Knowles et al.
7,468,521 B2 * 12/2008 Klunder et al. ............ 250/492.2
7,491,954 B2 2/2009 Bykanov et al.
2003/0147499 A1 8/2003 Kondo
2005/0045829 A1 * 3/2005 Ito et al. ........................ 250/372
2006/0163500 A1 * 7/2006 Inoue et al. ................ 250/493.1
2006/0192151 A1 8/2006 Bowering et al.
2006/0193997 A1 8/2006 Bykanov
2006/0289806 A1 12/2006 Simmons et al.
2007/0018119 A1 1/2007 Yabuta et al.
2007/0018122 A1 1/2007 Ershov et al.
2007/0023705 A1 2/2007 Partlo et al.
2007/0029512 A1 2/2007 Bowering et al.
2007/0069162 A1 * 3/2007 Banine et al. ............. 250/504 R
2007/0170377 A1 * 7/2007 Nakano ..................... 250/504 R
2008/0099699 A1 * 5/2008 Yabuta et al. ............. 250/504 R
2008/0179548 A1 * 7/2008 Bykanov et al. .......... 250/504 R
2008/0237498 A1 * 10/2008 MacFarlane ............... 250/493.1
2009/0057567 A1 * 3/2009 Bykanov et al. .............. 250/429
2009/0099699 A1 * 4/2009 Steinberg et al. ............. 700/278
2009/0127479 A1 * 5/2009 Hosokai et al. ........... 250/504 R
2009/0267005 A1 10/2009 Bykanov et al.
2009/0314967 A1 * 12/2009 Moriya et al. ............ 250/504 R
2010/0025600 A1 * 2/2010 Chavez et al. ............ 250/504 R
2010/0032590 A1 2/2010 Bykanov et al.
2010/0146980 A1 * 6/2010 Strom et al. .................... 60/770

OTHER PUBLICATIONS

Greenwood, N.N.; Earnshaw, A. Chemistry of the Elements, 1997, Elsevier, 2nd edition, p. 375.*
Greenwood, N.N.; Earnshaw, A. Chemistry of the Elements, 1997, Elsevier, 2nd Edition, pp. 374-375.*
Greenwood, N.N.; Earnshaw, A.; Chemistry of the Elements, 1997, Elsevier; 2nd Edition, pp. 374-375.*

(Continued)

*Primary Examiner* — Robert Kim
*Assistant Examiner* — Jason McCormack
(74) *Attorney, Agent, or Firm* — DiBerardino McGovern IP Group LLC

(57) ABSTRACT

An apparatus includes a light source having a gain medium for producing an amplified light beam of a source wavelength along a beam path to irradiate a target material in a chamber and to generate extreme ultraviolet light; and a subsystem overlying at least a portion of an internal surface of the chamber and configured to reduce a flow of light at the source wavelength from the internal surface back along the beam path.

25 Claims, 12 Drawing Sheets

OTHER PUBLICATIONS

PCT International Search Report issued in counterpart application PCT/US2011/030974 by Officer Blaine R. Copenheaver of the U.S. International Searching Authority on Jul. 5, 2011, 2 pages.

PCT Written Opinion issued in counterpart application PCT/US2011/030974 by Officer Blaine R. Copenheaver of the U.S. International Searching Authority on Jul. 5, 2011, 5 pages.

* cited by examiner

EUV LIGHT SOURCE GLINT REDUCTION SYSTEM

TECHNICAL FIELD

The disclosed subject matter relates to a vacuum chamber of a high power extreme ultraviolet light source.

BACKGROUND

Extreme ultraviolet ("EUV") light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material into a plasma state that has an element, for example, xenon, lithium, or tin, with an emission line in the EUV range. In one such method, often termed laser produced plasma ("LPP"), the required plasma can be produced by irradiating a target material, for example, in the form of a droplet, stream, or cluster of material, with an amplified light beam that can be referred to as a drive laser. For this process, the plasma is typically produced in a sealed vessel, for example, a vacuum chamber, and monitored using various types of metrology equipment.

$CO_2$ amplifiers and lasers, which output an amplified light beam at a wavelength of about 10600 nm, can present certain advantages as a drive laser irradiating the target material in an LPP process. This may be especially true for certain target materials, for example, for materials containing tin. For example, one advantage is the ability to produce a relatively high conversion efficiency between the drive laser input power and the output EUV power. Another advantage of $CO_2$ drive amplifiers and lasers is the ability of the relatively long wavelength light (for example, as compared to deep UV at 198 nm) to reflect from relatively rough surfaces such as a reflective optic that has been coated with tin debris. This property of 10600 nm radiation can allow reflective mirrors to be employed near the plasma for, for example, steering, focusing and/or adjusting the focal power of the amplified light beam.

SUMMARY

In some general aspects, an apparatus includes a light source having a gain medium for producing an amplified light beam of a source wavelength along a beam path to irradiate a target material in a chamber and to generate extreme ultraviolet light; and a subsystem overlying at least a portion of an internal surface of the chamber and configured to reduce a flow of light at the source wavelength from the internal surface back along the beam path.

Implementations can include one or more of the following features. The light source can be a laser source and the amplified light beam can be a laser beam.

The subsystem can include at least one vane. The at least one vane can be configured to extend from a chamber wall into a path of the amplified light beam. The at least one vane can have a conical shape defining a central open region for passage of the center of the amplified light beam.

The subsystem can be configured to chemically decompose a compound of the target material into at least one gas and at least one solid to enable removal of the gas from the interior of the chamber. The target material compound can include tin hydride and the at least one gas can be hydrogen and the at least one solid can be condensed tin. The condensed tin can be in a molten state.

The source wavelength can be in the infrared range of wavelengths.

The light source can include one or more power amplifiers. The light source can include a master oscillator that seeds one or more power amplifiers.

The subsystem can contact the internal chamber surface. The subsystem can include a coating on the internal chamber surface. The coating can be an anti-reflective coating. The coating can be an absorbing anti-reflective coating. The coating can be an interference coating.

In other general aspects, extreme ultraviolet light is produced by producing a target material at a target location within an interior of a vacuum chamber; supplying pump energy to a gain medium of at least one optical amplifier in a drive laser system to thereby produce an amplified light beam at a source wavelength; directing the amplified light beam along a beam path to thereby irradiate the target material to generate extreme ultraviolet light; and reducing a flow of light at the source wavelength from an interior surface of the vacuum chamber to the beam path.

Implementations can include one or more of the following features. For example, the generated extreme ultraviolet light emitted from the target material when the amplified light beam crosses the target location and strikes the target material can be collected.

The flow of light at the source wavelength can be reduced by directing at least a portion of the amplified light beam along a path that is distinct from the beam path. The flow of light at the source wavelength can be reduced by reflecting at least a portion of the amplified light beam between two vanes of a chamber subsystem.

The amplified light beam can be a laser beam.

A compound of the target material can be chemically decomposed into at least one gas and at least one solid to enable removal of the gas from the interior of the chamber. The target material compound can be chemically decomposed by chemically decomposing tin hydride into hydrogen and condensed tin. The condensed tin can be trapped within a chamber subsystem that reduces the flow of light at the source wavelength from the interior surface of the vacuum chamber to the beam path.

DRAWING DESCRIPTION

DESCRIPTION

Figure 1:
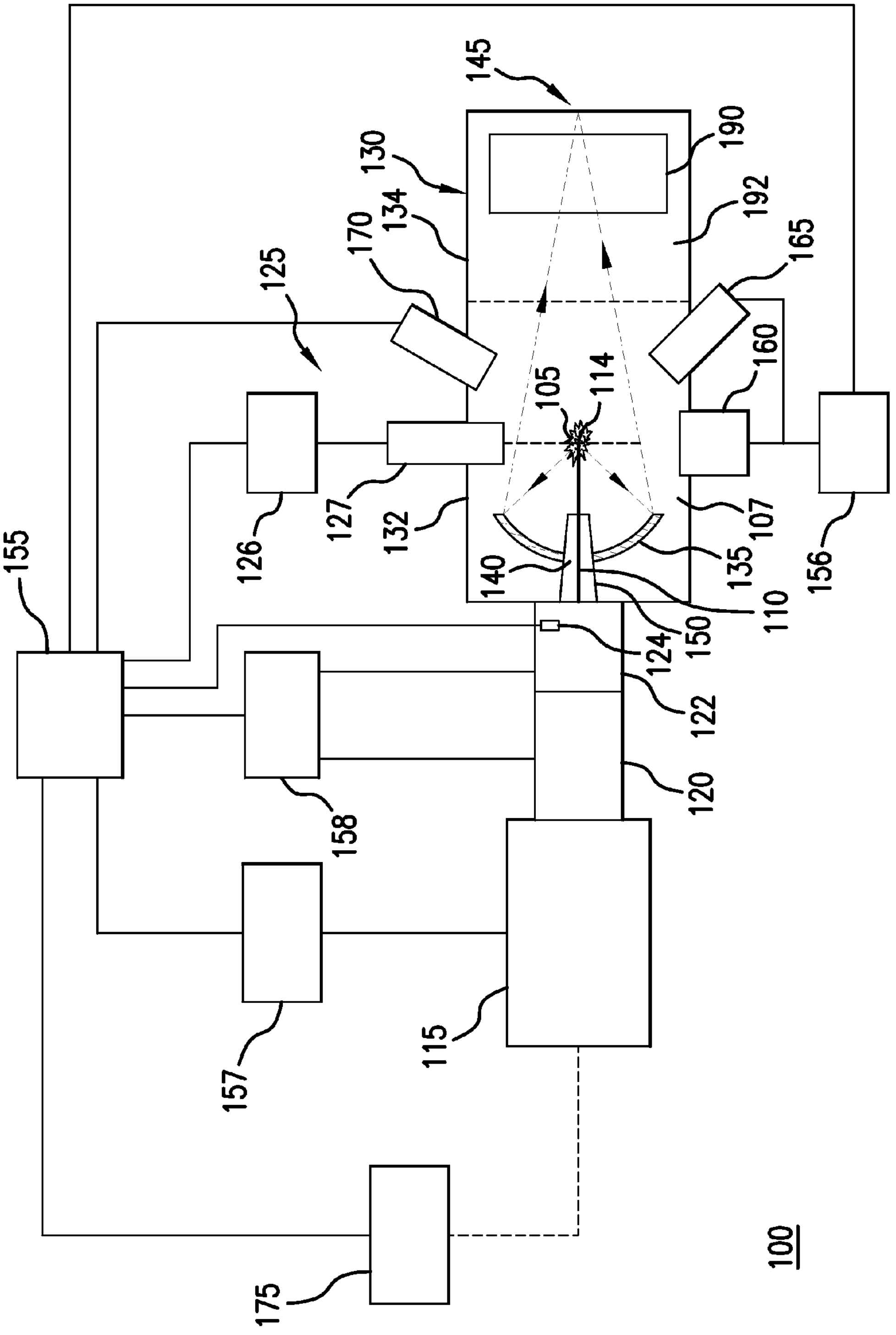
FIG. 1 is a block diagram of a laser produced plasma extreme ultraviolet light source.

Referring to FIG. 1, an LPP EUV light source 100 is formed by irradiating a target material 114 at a target location 105 with an amplified light beam 110 that travels along a beam path toward the target material 114. When the amplified light beam 110 strikes the target material 114, the target material 114 is converted into a plasma state that has an element with an emission line in the EUV range. The light source 100 includes a drive laser system 115 that produces the amplified light beam 110 due to a population inversion within the gain medium or mediums of the laser system 115.

The target location 105 is within an interior 107 of a vacuum chamber 130. The vacuum chamber 130 includes a primary chamber 132 and a secondary chamber 134. The secondary chamber 134 houses a chamber subsystem 190 within its interior 192. The chamber subsystem 190 is provided within the secondary chamber interior 192 to, among other things, reduce glint (reflection) that is produced at the interior walls of the chamber 130 when the amplified light beam 110 strikes it, to thereby reduce the amount of light that is reflected back along the beam path and to reduce self lasing. The chamber subsystem 190 can be anything that is added to the secondary chamber interior 192 that causes a reduction in glint and self lasing. Thus, the chamber subsystem 190 can be, for example, a rigid device that traps light such as a set of fixed planar surfaces that protrude into the secondary chamber interior 192. Such fixed planar surfaces can be vanes that are shaped with sharp edges that protrude into the path of the amplified light beam that travels into the secondary chamber 134 so that the spaces between the vanes form very deep cavities from which little light escapes along the path at which it entered, as described in detail below.

The other features of the light source 100 are described next prior to describing the design and operation of the secondary chamber 134 and the chamber subsystem 190.

The light source 100 includes a beam delivery system between the laser system 115 and the target location 105, the beam delivery system including a beam transport system 120 and a focus assembly 122. The beam transport system 120 receives the amplified light beam 110 from the laser system 115, and steers and modifies the amplified light beam 110 as needed and outputs the amplified light beam 110 to the focus assembly 122. The focus assembly 122 receives the amplified light beam 110 and focuses the beam 110 to the target location 105.

The light source 100 includes a target material delivery system 125, for example, delivering the target material 114 in the form of liquid droplets, a liquid stream, solid particles or clusters, solid particles contained within liquid droplets or solid particles contained within a liquid stream. The target material 114 can include, for example, water, tin, lithium, xenon, or any material that, when converted to a plasma state, has an emission line in the EUV range. For example, the element tin can be used as pure tin (Sn); as a tin compound, for example, $SnBr_4$, $SnBr_2$, $SnH_4$; as a tin alloy, for example, tin-gallium alloys, tin-indium alloys, tin-indium-gallium alloys, or any combination of these alloys. The target material 114 can include a wire coated with one of the above elements, such as tin. If the target material is in a solid state, it can have any suitable shape, such as a ring, a sphere, or a cube. The target material 114 can be delivered by the target material delivery system 125 into the interior 107 of a chamber 130 and to the target location 105. The target location 105 is also referred to as an irradiation site, the place where the target material 114 is irradiated by the amplified light beam 110 to produce plasma.

In some implementations, the laser system 115 can include one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the laser system 115 produces an amplified light beam 110 due to the population inversion in the gain media of the laser amplifiers even if there is no laser cavity. Moreover, the laser system 115 can produce an amplified light beam 110 that is a coherent laser beam if there is a laser cavity to provide enough feedback to the laser system 115. The term "amplified light beam" encompasses one or more of: light from the laser system 115 that is merely amplified but not necessarily a coherent laser oscillation and light from the laser system 115 that is amplified and is also a coherent laser oscillation.

The optical amplifiers in the laser system 115 can include as a gain medium a filling gas that includes $CO_2$ and can amplify light at a wavelength of between about 9100 and about 11000 nm, and in particular, at about 10600 nm, at a gain greater than or equal to 1000. Suitable amplifiers and lasers for use in the laser system 115 can include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 50 kHz or more. The optical amplifiers in the laser system 115 can also include a cooling system such as water that can be used when operating the laser system 115 at higher powers.

Figure 2A:
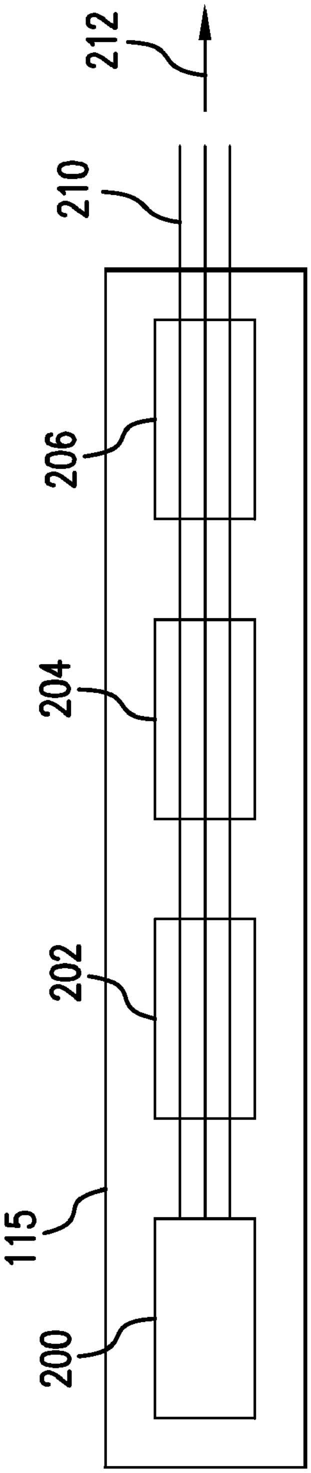
FIG. 2A is a block diagram of an exemplary drive laser system that can be used in the light source of FIG. 1.

Referring to FIG. 2A, in one particular implementation, the laser system 115 has a master oscillator/power amplifier (MOPA) configuration with multiple stages of amplification and having a seed pulse that is initiated by a Q-switched master oscillator (MO) 200 with low energy and high repetition rate, for example, capable of 100 kHz operation. From the MO 200, the laser pulse can be amplified, for example, using RF pumped, fast axial flow, $CO_2$ amplifiers 202, 204, 206 to produce an amplified light beam 210 traveling along a beam path 212.

Although three optical amplifiers 202, 204, 206 are shown, it is possible that as few as one amplifier and more than three amplifiers could be used in this implementation. In some implementations, each of the $CO_2$ amplifiers 202, 204, 206 can be an RF pumped axial flow $CO_2$ laser cube having a 10 meter amplifier length that is folded by internal mirrors.

Figure 2B:
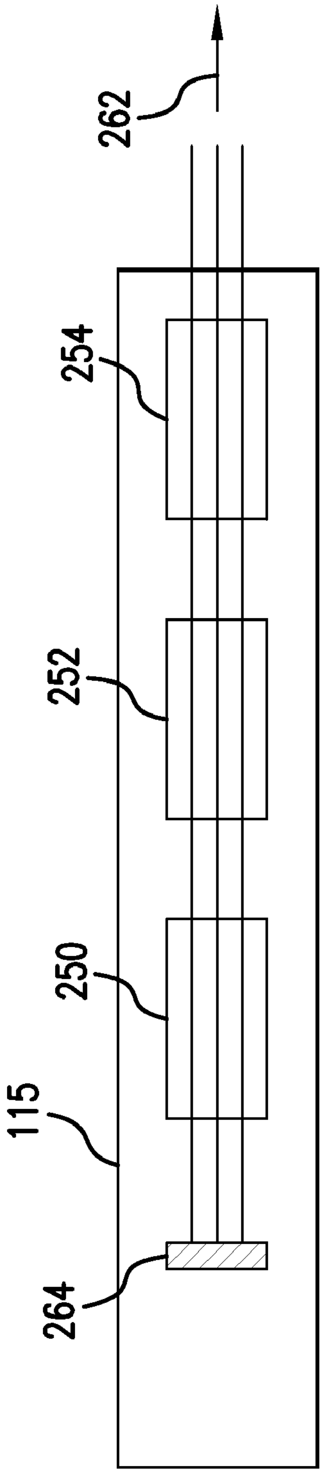
FIG. 2B is a block diagram of an exemplary drive laser system that can be used in the light source of FIG. 1.

Alternatively, and with reference to FIG. 2B, the drive laser system 115 can be configured as a so-called "self-targeting" laser system in which the target material 114 serves as one mirror of the optical cavity. In some "self-targeting" arrangements, a master oscillator may not be required. The laser system 115 includes a chain of amplifier chambers 250, 252, 254, arranged in series along a beam path 262, each chamber having its own gain medium and excitation source, for example, pumping electrodes. Each amplifier chamber 250, 252, 254, can be an RF pumped, fast axial flow, $CO_2$ amplifier chamber having a combined one pass gain of, for example, 1,000-10,000 for amplifying light of a wavelength λ of, for example, 10600 nm. Each of the amplifier chambers 250, 252, 254 can be designed without laser cavity (resonator) mirrors so that when set up alone they do not include the optical components needed to pass the amplified light beam through the gain medium more than once. Nevertheless, as mentioned above, a laser cavity can be formed as follows.

In this implementation, a laser cavity can be formed by adding a rear partially reflecting optic 264 to the laser system 115 and placing the target material 114 at the target location 105. The optic 264 can be, for example, a flat mirror, a curved mirror, a phase-conjugate mirror, or a corner reflector having a reflectivity of about 95% for wavelengths of about 10600 nm (the wavelength of the amplified light beam 110 if $CO_2$ amplifier chambers are used).

The target material 114 and the rear partially reflecting optic 264 act to reflect some of the amplified light beam 110 back into the laser system 115 to form the laser cavity. Thus, the presence of the target material 114 at the target location 105 provides enough feedback to cause the laser system 115 to produce coherent laser oscillation and in this case, the amplified light beam 110 can be considered a laser beam. When the target material 114 isn't present at the target location 105, the laser system 115 may still be pumped to produce the amplified light beam 110 but it would not produce a coherent laser oscillation unless some other component within the source 100 provides enough feedback. In particular, during the intersection of the amplified light beam 110 with the target material 114, the target material 114 may reflect light along the beam path 262, cooperating with the optic 264 to establish an optical cavity passing through the amplifier chambers 250, 252, 254. The arrangement is configured so the reflectivity of the target material 114 is sufficient to cause optical gains to exceed optical losses in the cavity (formed from the optic 264 and the droplet) when the gain medium within each of the chambers 250, 252, 254 is excited generating a laser beam for irradiating the target material 114, creating a plasma, and producing an EUV light emission within the chamber 130. With this arrangement, the optic 264, amplifiers 250, 252, 254, and the target material 114 combine to form a so-called "self-targeting" laser system in which the target material 114 serves as one mirror (a so-called plasma mirror or mechanical q-switch) of the optical cavity. Self-targeting laser systems are disclosed in U.S. application Ser. No. 11/580,414 filed on Oct. 13, 2006 entitled "Drive Laser Delivery Systems for EUV Light Source," the entire contents of which are hereby incorporated by reference herein.

Depending on the application, other types of amplifiers or lasers can also be suitable, for example, an excimer or molecular fluorine laser operating at high power and high pulse repetition rate. Examples include a solid state laser, for example, having a fiber or disk shaped gain medium, a MOPA configured excimer laser system, as shown, for example, in U.S. Pat. Nos. 6,625,191; 6,549,551; and 6,567,450; an excimer laser having one or more chambers, for example, an oscillator chamber and one or more amplifying chambers (with the amplifying chambers in parallel or in series); a master oscillator/power oscillator (MOPO) arrangement, a power oscillator/power amplifier (POPA) arrangement; or a solid state laser that seeds one or more excimer or molecular fluorine amplifier or oscillator chambers, may be suitable. Other designs are possible.

At the irradiation site, the amplified light beam 110, suitably focused by the focus assembly 122, is used to create plasma having certain characteristics that depend on the composition of the target material 114. These characteristics can include the wavelength of the EUV light produced by the plasma and the type and amount of debris released from the plasma.

The light source 100 includes a collector mirror 135 having an aperture 140 to allow the amplified light beam 110 to pass through and reach the target location 105. The collector mirror 135 can be, for example, an ellipsoidal mirror that has a primary focus at the target location 105 and a secondary focus at an intermediate location 145 (also called an intermediate focus) where the EUV light can be output from the light source 100 and can be input to, for example, an integrated circuit lithography tool (not shown). The light source 100 can also include an open-ended, hollow conical shroud 150 (for example, a gas cone) that tapers toward the target location 105 from the collector mirror 135 to reduce the amount of plasma-generated debris that enters the focus assembly 122 and/or the beam transport system 120 while allowing the amplified light beam 110 to reach the target location 105. For this purpose, a gas flow can be provided in the shroud that is directed toward the target location 105.

The light source 100 can also include a master controller 155 that is connected to a droplet position detection feedback system 156, a laser control system 157, and a beam control system 158. The light source 100 can include one or more target or droplet imagers 160 that provide an output indicative of the position of a droplet, for example, relative to the target location 105 and provide this output to the droplet position detection feedback system 156, which can, for example, compute a droplet position and trajectory from which a droplet position error can be computed either on a droplet by droplet basis or on average. The droplet position detection feedback system 156 thus provides the droplet position error as an input to the master controller 155. The master controller 155 can therefore provide a laser position, direction, and timing correction signal, for example, to the laser control system 157 that can be used, for example, to control the laser timing circuit and/or to the beam control system 158 to control an amplified light beam position and shaping of the beam transport system 120 to change the location and/or focal power of the beam focal spot within the chamber 130.

The target material delivery system 125 includes a target material delivery control system 126 that is operable in response to a signal from the master controller 155, for example, to modify the release point of the droplets as released by a delivery mechanism 127 to correct for errors in the droplets arriving at the desired target location 105.

Additionally, the light source 100 can include a light source detector 165 that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector 165 generates a feedback signal for use by the master controller 155. The feedback signal can be, for example, indicative of the errors in parameters such as the timing and focus of the laser pulses to properly intercept the droplets in the right place and time for effective and efficient EUV light production.

The light source 100 can also include a guide laser 175 that can be used to align various sections of the light source 100 or to assist in steering the amplified light beam 110 to the target location 105. In connection with the guide laser 175, the light source 100 includes a metrology system 124 that is placed within the focus assembly 122 to sample a portion of light from the guide laser 175 and the amplified light beam 110. In other implementations, the metrology system 124 is placed within the beam transport system 120. The metrology system 124 can include an optical element that samples or re-directs a subset of the light, such optical element being made out of any material that can withstand the powers of the guide laser beam and the amplified light beam 110. A beam analysis system is formed from the metrology system 124 and the master controller 155 since the master controller 155 analyzes the sampled light from the guide laser 175 and uses this information to adjust components within the focus assembly 122 through the beam control system 158.

Thus, in summary, the light source 100 produces an amplified light beam 110 that is directed along the beam path to irradiate the target material 114 at the target location 105 to convert the target material into plasma that emits light in the EUV range. The amplified light beam 110 operates at a particular wavelength (that is also referred to as a source wavelength) that is determined based on the design and properties of the laser system 115. Additionally, the amplified light beam 110 can be a laser beam when the target material provides enough feedback back into the laser system 115 to produce coherent laser light or if the drive laser system 115 includes suitable optical feedback to form a laser cavity.

Referring again to FIG. 1, the primary chamber 132 houses the collector mirror 135, the delivery mechanism 127, the target imagers 160, the target material 114, and the target location 105. The secondary chamber 134 houses the chamber subsystem 190 and the intermediate location 145. The cylindrical walls of the primary and secondary chambers 132, 134 are cooled, for example, by water cooling to prevent overheating within the chambers 132, 134 and, in particular, to prevent overheating of the collector mirror 135.

Figure 3:
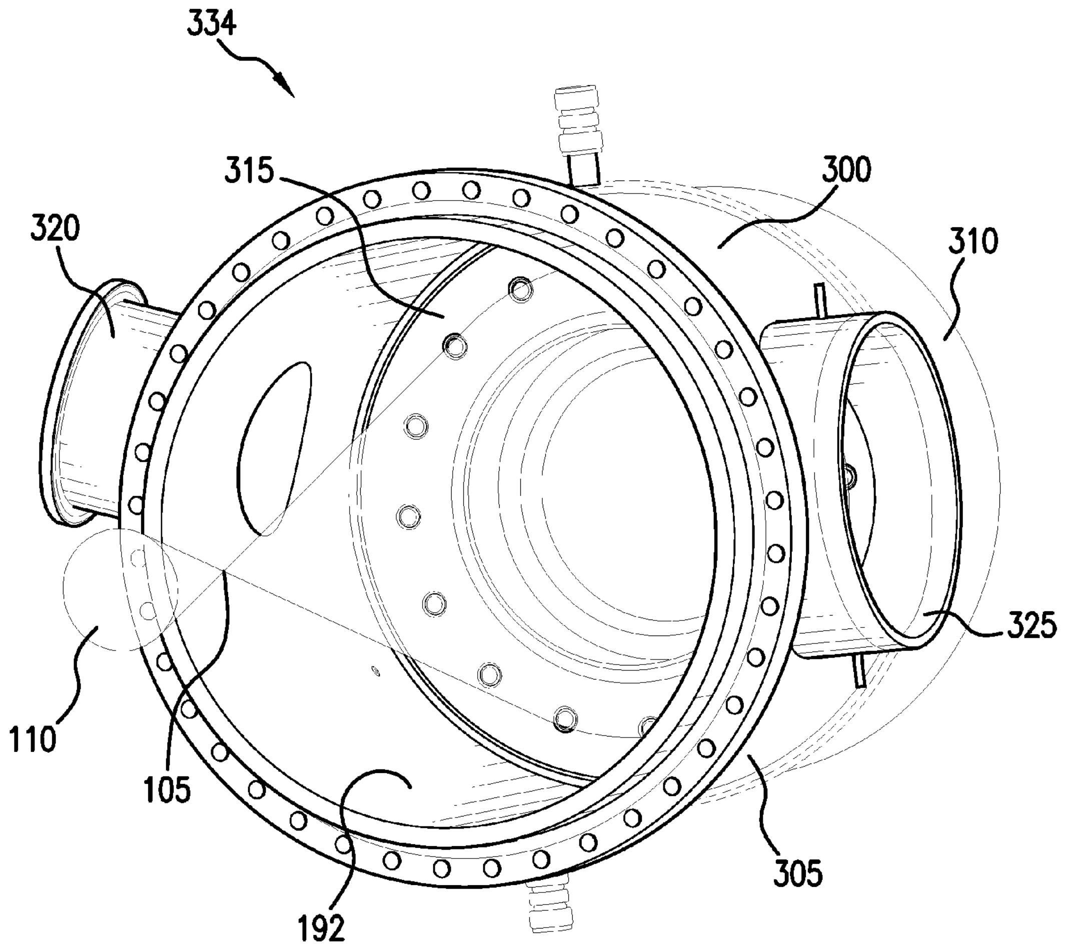
FIG. 3 is a perspective view of a secondary chamber of a vacuum chamber that can be used in the light source of FIG. 1.

Referring to FIG. 3, a secondary chamber 334 includes a cylindrical wall 300 that defines the chamber interior 192. The secondary chamber 334 includes a first vessel 305 that is fluidly connected with the primary chamber 132 and a second vessel 310 that is fluidly connected with the first vessel 305. The primary and secondary chambers 132, 134 are hermetically sealed from atmosphere. A front annular wall 315 of the second vessel 310 separates the first vessel 305 from the second vessel 310. The first vessel 305 includes an opening 320 for vacuum pumping and an opening 325 that permits imaging and analysis of the collector mirror 135.

In this particular design, the secondary chamber 334 lacks the chamber subsystem 190. Because of this, several problems can arise during operation of a light source 100 that includes the secondary chamber 334. During operation, the amplified light beam 110 is focused to the target location 105, after which the light beam diverges into the secondary chamber 334 and toward the front annular wall 315 of the second vessel 310. The diverging light beam 110 portion that interacts with the front annular wall 315 is reflected by the front annular wall 315 (and potentially by other features within the secondary chamber 334) and can be directed back along the beam path along which the light beam 110 traveled and toward the drive laser system 115. This feedback light causes self lasing within the drive laser system 115, and this self lasing reduces the amplification of the light beam 110 (and therefore the laser power) inside the laser system 115 and therefore would transfer less power to the target material 114.

Additionally, as discussed above, the target material 114 can be, for example, pure tin (Sn), or a tin compound, for example, $SnBr_4$, $SnBr_2$, $SnH_4$, or a tin alloy, for example, tin-gallium alloys, tin-indium alloys, tin-indium-gallium alloys, or any combination of these alloys.

Tin vapor can be produced when the tin droplets (the target material 114) go through the plasma that is formed when the light beam 110 strikes the tin droplets. This tin vapor can condense on optical surfaces (such as the collector mirror 135) within the vacuum chamber 130 and cause inefficiencies at these optical surfaces. To remove the condensed tin from these optical surfaces, an etchant of buffer gas (such as $H_2$) can be applied to the optical surfaces to clean the optical surfaces. $SnH_x$ compounds can be formed when $H_2$ is used for etching because the collector mirror 135 is maintained at sub-zero temperature at all times, and when $H_2$ radicals react with tin, $SnH_x$ is produced, where x can be 1, 2, 4, etc. $SnH_4$ is the most stable of these produced compounds.

Moreover, there is a risk that if tin compound is used as the target material 114, then the tin compound (in the form of debris or microdroplets) would be pumped out of the chamber 130 through the opening 320 and into the vacuum pump, which could cause malfunctioning and destruction of the vacuum pump.

$SnH_4$ starts to chemically decompose at a temperature of about 50° C. into condensed Sn and hydrogen. Moreover, condensed Sn transitions to a molten state above its melting point of about 250° C. Thus, if the $SnH_4$ strikes a surface that is at a temperature of 250 C, molten Sn and hydrogen are formed. The condensed (and molten) Sn could accumulate at a surface of the chamber 130 so that it is not evacuated through the opening 320 and into the vacuum pump. However, because the chamber walls are kept below the decomposition temperature of the compound, the $SnH_4$ fails to chemically decompose and therefore the $SnH_4$ remains a solid in a vapor state that is evacuated out of the chamber through the opening 320 and into the vacuum pump.

Figure 4:
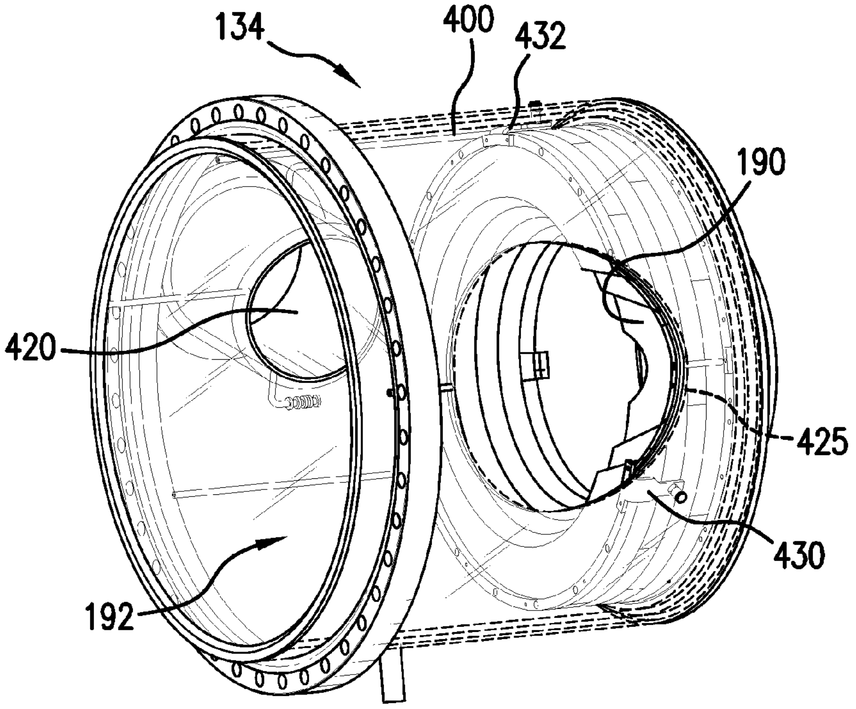
FIG. 4 is a perspective view of a secondary chamber including an exemplary chamber subsystem that can be used in the light source of FIG. 1.
Figure 5:
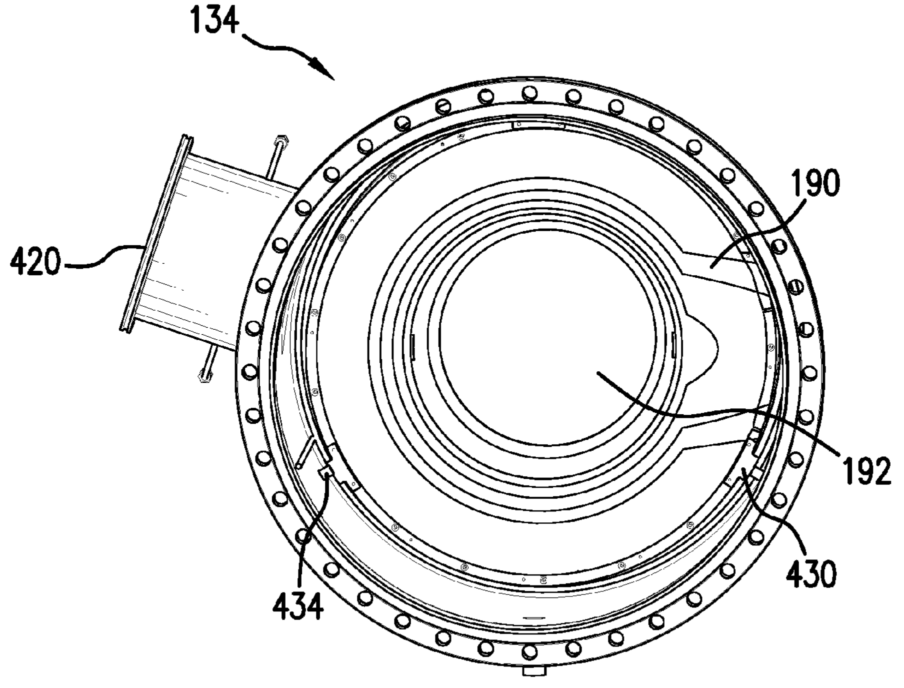
FIG. 5 is a front plan view of the secondary chamber of FIG. 4.
Figure 6:
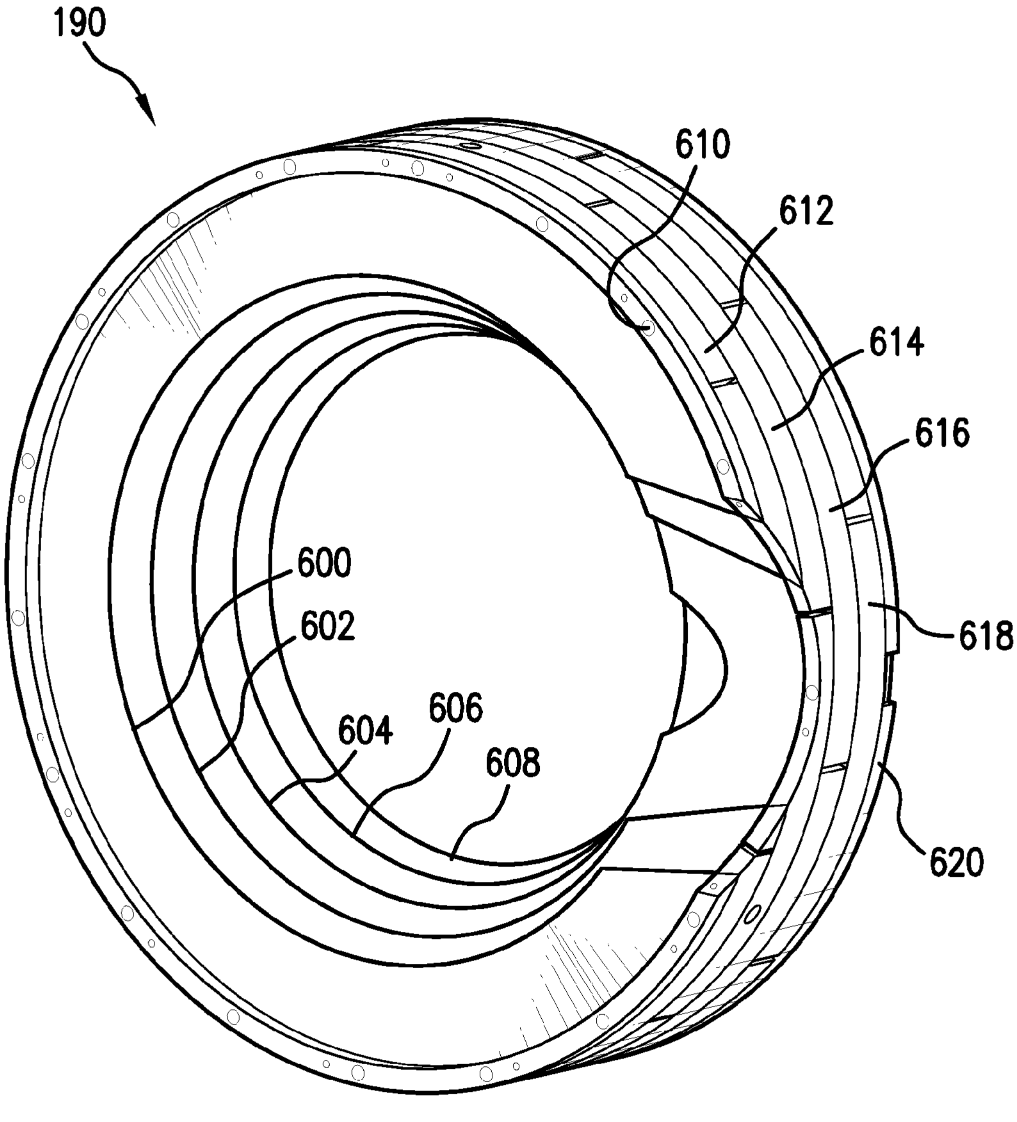
FIG. 6 is a perspective view of a chamber subsystem that can be incorporated in the secondary chamber of FIGS. 4 and 5.
Figure 7:
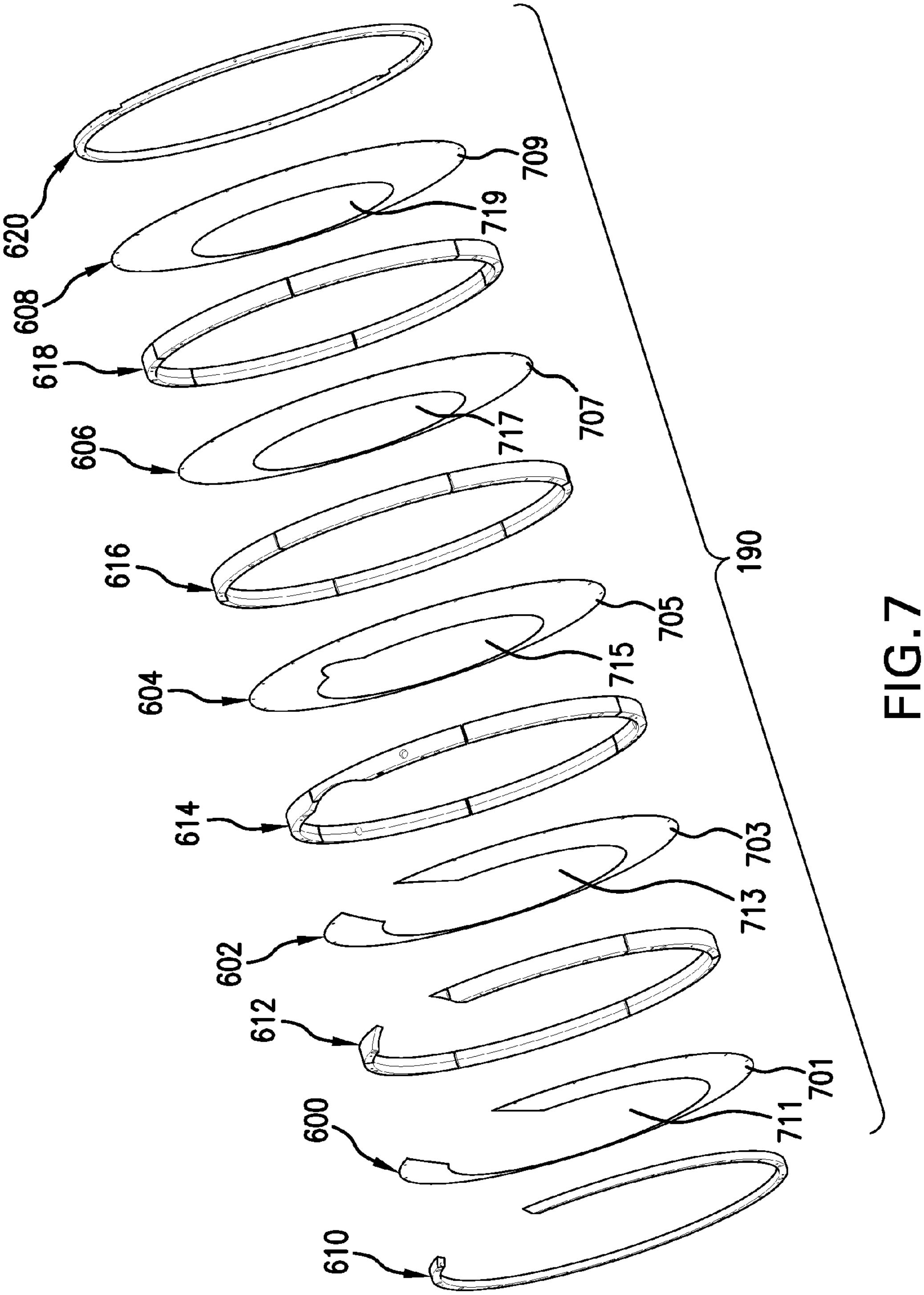
FIG. 7 is an exploded perspective view of the chamber subsystem of FIG. 6.
Figure 8B:
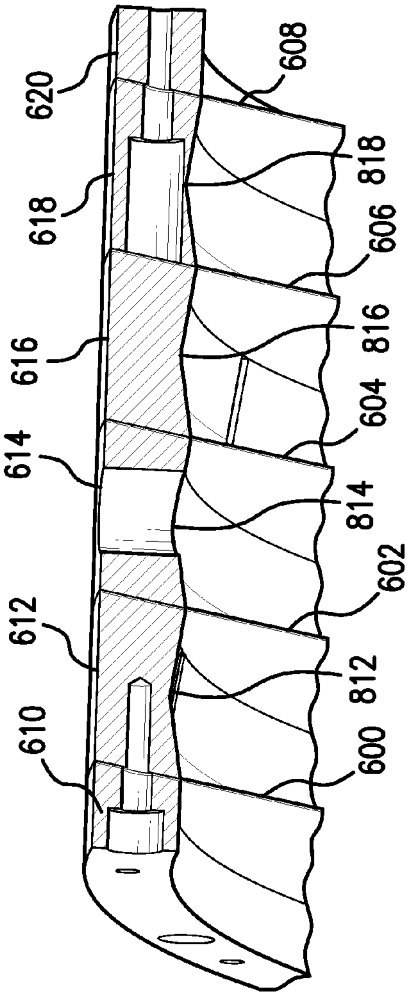
FIG. 8B is a detail perspective cross sectional view of the chamber subsystem of FIG. 8A.
Figure 8A:
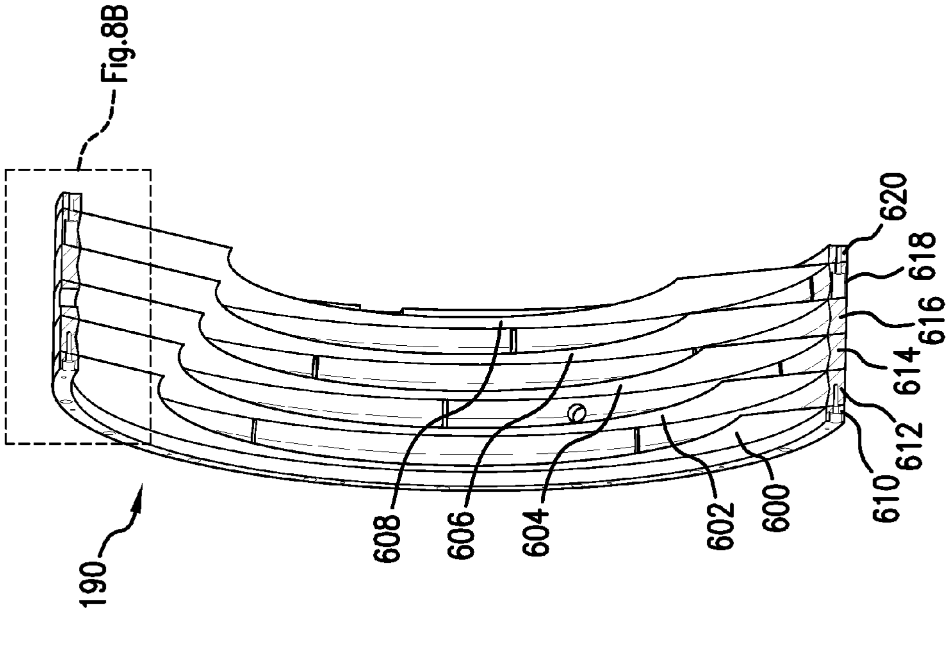
FIG. 8A is a perspective cross sectional view of the chamber subsystem of FIGS. 6 and 7.

Accordingly, referring to FIGS. 4 and 5, the secondary chamber 134 is designed with the chamber subsystem 190 housed within a cylindrical wall 400 that defines the chamber interior 192. The chamber subsystem 190 is configured to reduce self lasing, and to decompose the solid form of the target material into a molten form that remains trapped within the chamber interior 192 and a safe vapor (for example, $H_2$) that can be evacuated from the secondary chamber 134 through an opening 420 and into the vacuum pump. Like the secondary chamber 334, the secondary chamber 134 includes an opening 420 for vacuum pumping and an opening 425 that permits imaging of the collector mirror 135. The wall 400 of the secondary chamber 134 can be made of any suitable rigid material such as stainless steel.

Instead of a front annular wall 315 to separate first and second vessels, the secondary chamber 134 includes the chamber subsystem 190. The chamber subsystem 190 is rigidly suspended inside the interior 192 with suitable attachment devices such as brackets 430, 432, 434 that connect an outer surface of the chamber subsystem 190 with the surface of the interior 192. As shown herein, the chamber subsystem 190 is positioned downstream of the opening 420. However, it is possible to design the chamber subsystem 190 to be positioned at another location within the secondary chamber 134, within the primary chamber 132, or within another new chamber as long as the chamber subsystem 190 overlies at least a portion of the internal surface of the vacuum chamber 130 and is configured to reduce a flow of the amplified light beam 110 (which can be a laser beam) at the source wavelength from the internal surface back along the beam path.

Referring also to FIGS. 6-9B, the chamber subsystem 190 includes one or more fixed annular conical vanes 600, 602, 604, 606, 608 interleaved with one or more supports or brackets 610, 612, 614, 616, 618, 620. Each of the fixed vanes 600-608 and brackets 610-620 can be made of a rigid material such as stainless steel or molybdenum. Each of the vanes 600-608 is conical in shape, includes a center open region, and is held in place at its respective edge 701, 703, 705, 707, 709 (see FIG. 7), which is sandwiched between adjacent brackets. Thus, the edge 701 is sandwiched between the brackets 610 and 612, the edge 703 is sandwiched between the brackets 612 and 614, the edge 705 is sandwiched between the brackets 614 and 616, the edge 707 is sandwiched between the brackets 616 and 618, and the edge 709 is sandwiched between the brackets 618 and 620.

Figure 9B:
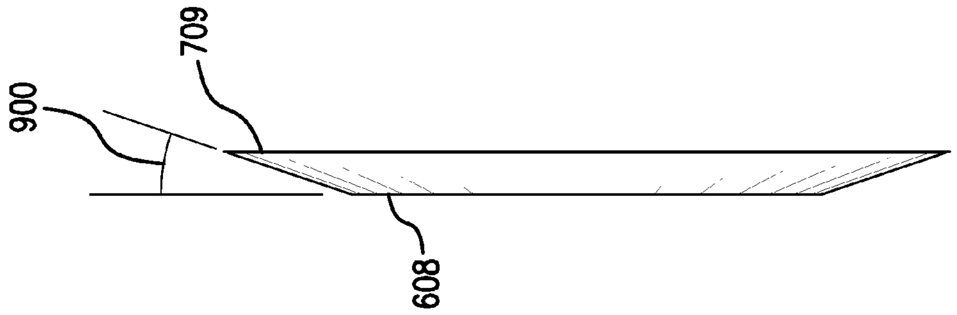
FIG. 9B is a side plan view of the vane of FIG. 9A.
Figure 9A:
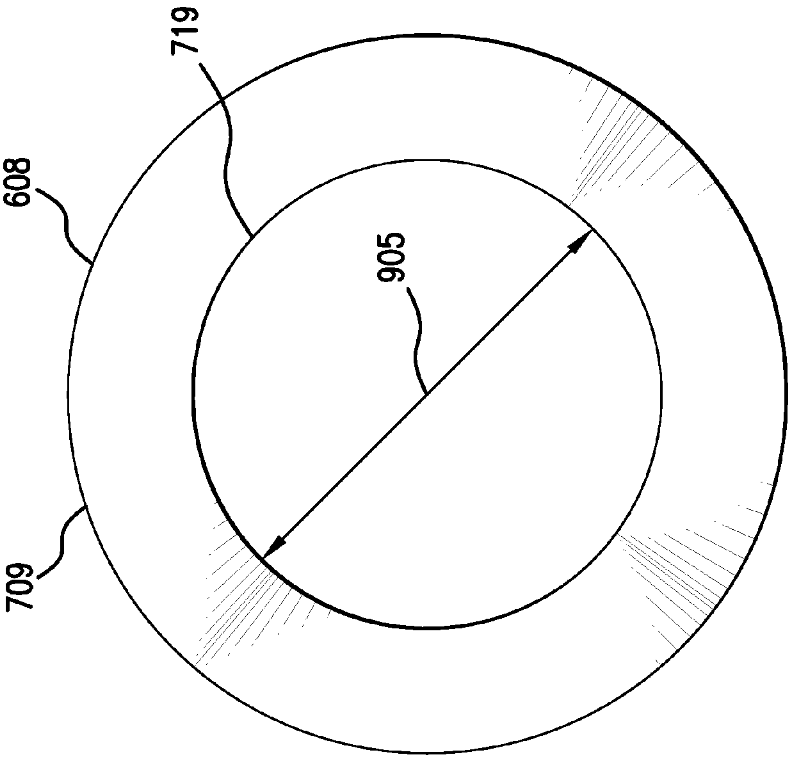
FIG. 9A is a front plan view of a vane that can be used in the chamber subsystem of FIGS. 6-8B.

Each of the vanes 600-608 includes a respective central open region 711, 713, 715, 717, 719 that provides for passage of the extreme ultraviolet light emitted from the target material 114. In some implementations, each of the vanes 600-608 is configured with a conical angle (that is, the angle between the outer conical surface and the plane that is perpendicular to the beam path) that is distinct from the conical angles of the other vanes. Thus, as shown in FIG. 9B, the vane 608 has a conical angle 900 that is distinct from the conical angles of the other vanes 600, 602, 604, 606.

Moreover, in some implementations, each of the vanes 600-608 is configured with an annular width (that is, the width of the conical surface taken along the diameter that extends along the plane that is perpendicular to the beam path) that is distinct from the annular widths of the other vanes. Or, to put it another way, each of the vanes 600-608 is configured with an open region having a diameter (taken along the plane that is perpendicular to the beam path) that is distinct from the diameters of the other open regions. Thus, as shown in FIG. 9B, the vane 608 has a diameter 905 of its open region 719 that is distinct from the diameter of the open regions 711, 713, 715, 717 of the other vanes 600, 602, 604, 606.

The open region diameters can be graded so that, for example, the open region diameter of the vane 600 is greater than the open region diameter of the vane 602, the open region diameter of the vane 602 is greater than the open region diameter of the vane 604, and so on. The conical angles can also be graded so that, for example, the angles get progressively smaller from the vane 600 to the vane 608. The reason that these two geometric features (the conical angles and the open region diameters) of the vanes are graded is that the incoming amplified light beam diverges as it passes through the chamber subsystem 190 and the graded geometric features are configured to collect as much as the diverging beam as possible, as discussed in greater detail below.

In any case, the open region diameters, the conical angles, and the level of grading (if any) of these parameters can be selected to depend on the type of (for example, the type of drive laser system 115) and geometry (for example, the numerical aperture of the beam) amplified light beam 110 used in the light source 100. Thus, for example, the design of the chamber subsystem 190 shown herein is configured for a drive laser system 115 that includes $CO_2$ amplifiers and produces an amplified light beam 110 having a numerical aperture of about 0.21.

Referring again to FIGS. 8A and 8B, each of the brackets 612, 614, 616, 618 can include a respective angled inner annular surface 812, 814, 816, 818. These angled surfaces provide additional diversion of the diverging amplified light beam by breaking up an incoming beam into two outgoing beams that are reflected from the surfaces 812, 814, 816, 818 of each bracket at distinct angles, as discussed in more detail below.

Figure 10:
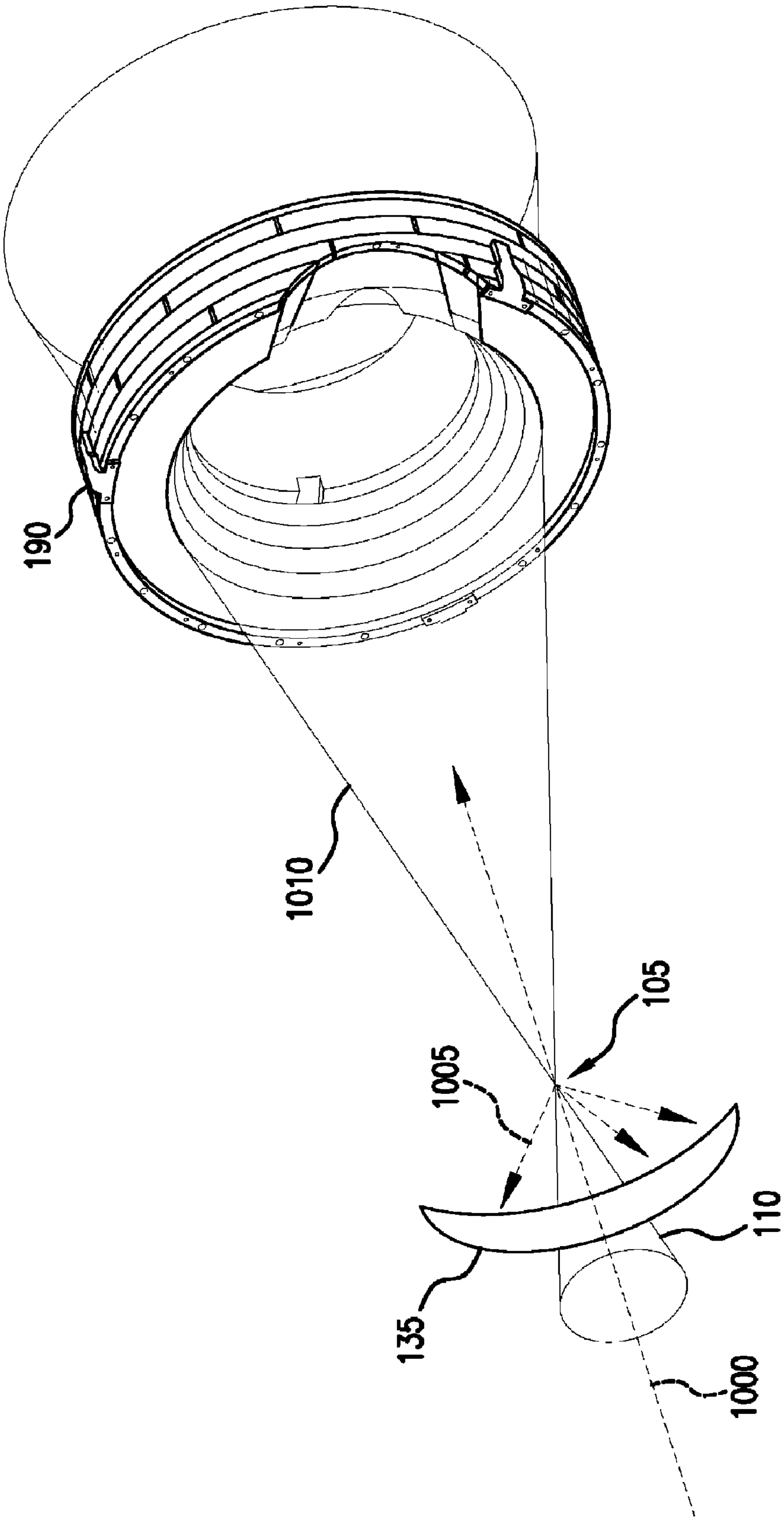
FIG. 10 is a perspective view of the chamber subsystem of FIGS. 6-8B showing the path of an amplified light beam in the vacuum chamber.
Figure 11:
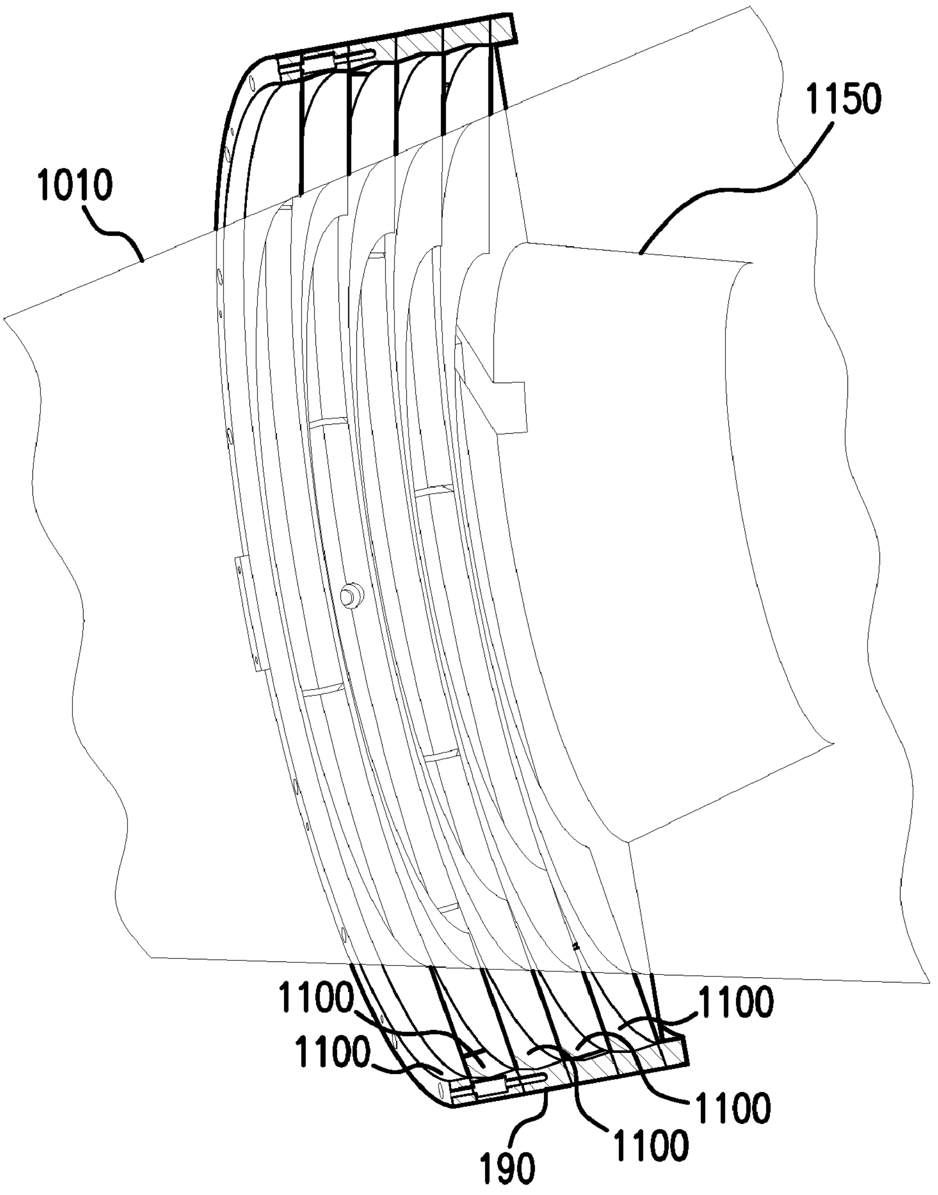
FIG. 11 is a perspective cross sectional view of the chamber subsystem and the amplified light beam of FIG. 10.
Figure 12:
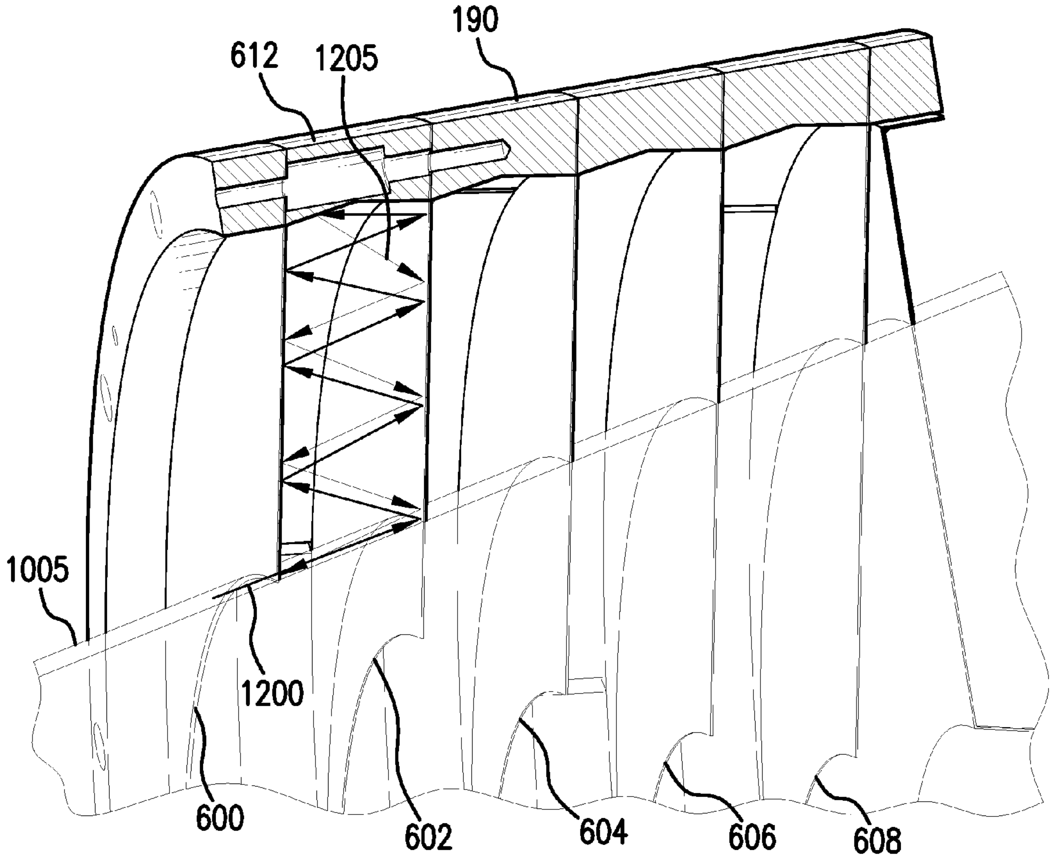
FIG. 12 is a detail perspective cross sectional view of the chamber subsystem and the amplified light beam of FIG. 11.

Referring also to FIGS. 10-12, in operation of the light source 100, the amplified light beam 110 travels along a beam path 1000 so that it is focused at the target location 105 to thereby irradiate the target material 114 (not shown in FIG. 10). The target material 114 is converted into a plasma state that has an element with an emission line in the EUV range and therefore EUV light 1005 is emitted from the target material 114 and is collected by the collector mirror 135. Meanwhile, a diverging amplified light beam 1010 travels away from the target location 105 toward the secondary chamber 134 (not shown in FIG. 10) and toward the chamber subsystem 190. The target material 114 volume is smaller than the focal region (that is, the waist) of the amplified light beam 110 at the primary focus. So while the central portion of the amplified light beam 110 interacts with the target material 114, the non-interacted amplified light beam 110 starts to diverge out past this focal region to become the diverging amplified light beam 1010. The interacted portion of the amplified light beam 110 beam reflects from the target material 114 and can be directed back into the laser system for amplification.

As the amplified light beam 1010 travels past the open regions of the subsystem 190, it is deflected (reflected) by the successive vanes 600, 602, 604, 606, 608. Referring specifically to FIG. 12, an exemplary incoming ray 1200 of the light beam 1010 passes through the vane 600 but strikes a side surface of the vane 602, where the ray 1200 is bounced several times between the vane 602 and the vane 600. The incoming ray 1200 reflects off the angled inner annular surface 812 of the bracket 612 to form an outgoing ray 1205. The path of the outgoing ray 1205 does not coincide with the path of the incoming ray 1200 because of the distinct angles of each of the conical surfaces of vanes 600 and 602 and therefore the outgoing ray 1205 does not travel back along the beam path toward the primary focus of the collector mirror 135 (which is inside the target location 105) and therefore the outgoing ray 1205 does not travel back into the drive laser system 115.

Additionally, the ray 1200, 1205 loses a small percentage (for example, about 10%) of its power at each bounce off the vane 600 or 602. Because of this, some energy is imparted to the vanes, thereby causing the vanes 600, 602, 604, 606, 608 to heat up. Moreover, as the vanes 600, 602, 604, 606, 608 heat up to above the decomposition temperature (and more specifically above the temperature at which the components are molten) of the target material compound (for example, above 250 C for Sn), any compound (such as $SnH_4$) that strikes the vanes would decompose into a molten element (such as Sn) and hydrogen. And, the molten element is left to accumulate at the lower internal surface 1210 of the brackets 610, 612, 614, 616, 618, 620 while the hydrogen is evacuated through the opening 420 and into the vacuum pump.

Figure 13:
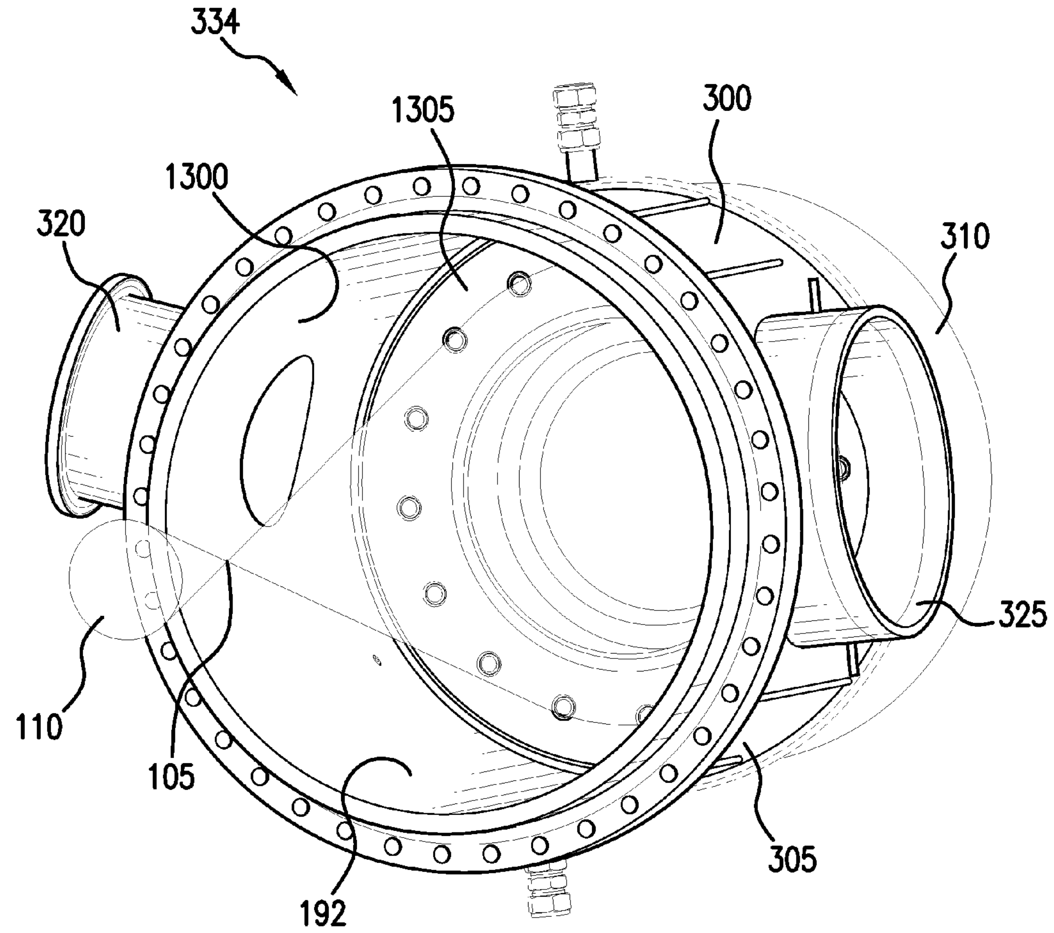
FIG. 13 is a perspective view of a secondary chamber including an exemplary chamber subsystem that can be used in the light source of FIG. 1.

Referring also to FIG. 13, in other implementations, the chamber subsystem 190 can be one or more coatings 1300 that are applied to at least a portion of the chamber interior walls and that redirect laser light that passes through the target location 105 and would otherwise strike the chamber interior walls. For example, the coating can be an anti-reflective coating consisting of transparent thin film structures with alternating layers of contrasting refractive index such as a dielectric stack. The layer thicknesses are chosen to produce destructive interference in the beams reflected from the interfaces, and constructive interference in the corresponding transmitted beams. This makes the structure's performance change with wavelength and incident angle, so that color effects often appear at oblique angles. The coating 1300 must be able to effectively coat the interior wall and therefore the type of coating can be selected depending on the material used for the interior wall.

As another example, the coating can be an absorbing anti-reflective coating that uses compound thin films produced by sputter deposition such as titanium nitride and niobium nitride. As another example, the coating can be an interference coating.

The chamber subsystem 190 can be designed using any suitably designed higher-power beam dump that avoids back-reflection, overheating, or excessive noise. For example, the chamber subsystem 190 can be a deep, dark cavity lined with an absorbing material to dump the beam. As another example, the chamber subsystem 190 can be configured to refract or reflect the light.

Although the detector 165 is shown in FIG. 1 positioned to receive light directly from the target location 105, the detector 165 could alternatively be positioned to sample light at or downstream of the intermediate focus 145 or some other location.

In general, irradiation of the target material 114 can also generate debris at the target location 105, and such debris can contaminate the surfaces of optical elements including but not limited to the collection mirror 135. Therefore, a source of gaseous etchant capable of reaction with constituents of the target material 114 can be introduced into the chamber 130 to clean contaminants that have deposited on surfaces of optical elements, as described in U.S. Pat. No. 7,491,954, which is incorporated herein by reference in its entirety. For example, in one application, the target material can include Sn and the etchant can be HBr, $Br_2$, $Cl_2$, HCl, $H_2$, $HCF_3$, or some combination of these compounds.

The light source 100 can also include one or more heaters 170 that initiate and/or increase a rate of a chemical reaction between the deposited target material and the etchant on a surface of an optical element. For a plasma target material that includes Li, the heater 170 can be designed to heat the surface of one or more optical elements to a temperature in the range of about 400 to 550° C. to vaporize Li from the surface, that is, without necessarily using an etchant. Types of heaters that can be suitable include radiative heaters, microwave heaters, RF heaters, ohmic heaters, or combinations of these heaters. The heater can be directed to a specific optical element surface, and thus be directional, or it can be non-directional and heat the entire chamber 130 or substantial portions of the chamber 130.

In other implementations, the target material 114 includes lithium, lithium compounds, xenon, or xenon compounds.

The diverging amplified light beam 1010 can be restricted using other devices without restricting the EUV light 1005 emitted from the target material 114. This can be done by determining an intermittent volume in which there is an annular gap between the converging EUV light 1005 and the diverging amplified light beam 1010 past the secondary chamber 134 and trapping the diverging amplified light beam 1010 that could not be trapped in the secondary chamber 134. Even with the additional traps and/or restrictions, there can still be a significant amount of light beam (for example, about 1.5 kW of laser power) that passes through the intermediate focus 145 and this light beam can be trapped past the intermediate focus 145.

Referring again to FIG. 11, the chamber subsystem 190 can include an additional fin 1150 that protrudes into the center of the subsystem 190 to keep a gate valve (not shown) of the secondary chamber 134 in the shadow of the diverging amplified light beam 1010. The additional fin 1150 can be made of stainless steel to reflect about 90% of the power with each bounce of the amplified light beam 1010.

Other implementations are within the scope of the following claims.

What is claimed is:

1. An apparatus comprising:

a chamber defining an internal surface, the chamber housing a collector mirror having a shape that defines a primary focus at a target location and a secondary focus at an intermediate location;

a light source configured to produce an amplified light beam along a beam path through an aperture of the collector mirror to irradiate a target material in the chamber at the target location and to generate extreme ultraviolet light, the light source including a gain medium for amplifying light of a source wavelength; and a subsystem overlying at least a portion of the internal surface of the chamber, the subsystem including a plurality of annular features, each annular feature having a central open region that permits generated extreme ultraviolet light to pass through to the intermediate focus and each annular feature extends from a chamber wall into a path of the amplified light beam, wherein the subsystem is configured to reduce a flow of the amplified light beam at the source wavelength from the chamber internal surface back along the beam path toward the light source.

2. The apparatus of claim 1, wherein the light source is a laser source and the amplified light beam is a laser beam.

3. The apparatus of claim 1, wherein each annular feature of the subsystem comprises at least one conical vane.

4. The apparatus of claim 1, wherein the central open region permits the passage of the center portion of the amplified light beam.

5. The apparatus of claim 1, wherein the subsystem is configured to chemically decompose a compound of the target material into at least one gas and at least one solid to enable removal of the gas from the interior of the chamber.

6. The apparatus of claim 5, wherein the target material compound includes tin hydride and the at least one gas is hydrogen and the at least one solid is condensed tin.

7. The apparatus of claim 6, wherein the condensed tin is in a molten state.

8. The apparatus of claim 1, wherein the source wavelength is in the infrared range of wavelengths.

9. The apparatus of claim 1, wherein the light source includes one or more power amplifiers.

10. The apparatus of claim 1, wherein the light source includes a master oscillator that seeds one or more power amplifiers.

11. The apparatus of claim 1, wherein the subsystem contacts the internal chamber surface.

12. The apparatus of claim 1 further comprising:

a coating configured to reduce a flow of the amplified light beam at the source wavelength from the internal surface back along the beam path toward the light source.

13. The apparatus of claim 12, wherein the coating is an anti-reflective coating.

14. The apparatus of claim 12, wherein the coating is an absorbing anti-reflective coating.

15. The apparatus of claim 12, wherein the coating is an interference coating.

16. A method for producing extreme ultraviolet light, the method comprising:

producing a target material at a target location within an interior of a vacuum chamber;

supplying pump energy to a gain medium of at least one optical amplifier in a drive laser system to thereby produce an amplified light beam at a source wavelength;

directing the amplified light beam along a beam path to thereby irradiate the target material to generate extreme ultraviolet light;

permitting generated extreme ultraviolet light to pass through a central open region of a plurality of annular features of a chamber subsystem that overlies at least a portion of the internal surface of the chamber, with each annular feature extending from a chamber wall into a path of the amplified light beam; and reducing a flow of light at the source wavelength from an interior surface of the vacuum chamber to the beam path by reflecting at least a portion of the amplified light beam between two vanes of the chamber subsystem.

17. The method of claim 16, further comprising collecting the generated extreme ultraviolet light emitted from the target material when the amplified light beam crosses the target location and strikes the target material.

18. The method of claim 16, wherein reducing a flow of light at the source wavelength includes directing at least a portion of the amplified light beam along a path that is distinct from the beam path.

19. The method of claim 16, wherein supplying pump energy to the gain medium of the at least one optical amplifier produces a laser beam at the source wavelength.

20. The method of claim 16, further comprising chemically decomposing a compound of the target material into at least one gas and at least one solid to enable removal of the gas from the interior of the chamber.

21. The method of claim 20, wherein chemically decomposing the compound includes chemically decomposing tin hydride into hydrogen and condensed tin.

22. The method of claim 21, further comprising trapping the condensed tin within a chamber subsystem that reduces the flow of light at the source wavelength from the interior surface of the vacuum chamber to the beam path.

23. The method of claim 16, wherein reducing a flow of light at the source wavelength includes destructively interfering beams of the light reflected at interfaces of a coating applied to the interior surface of the vacuum chamber.

24. The apparatus of claim 3, wherein each conical vane has a conical angle that is distinct from the conical angles of the other conical vanes.

25. The apparatus of claim 3, wherein each conical vane has a distinct annular width.

* * * * *